Oct. 28, 1952  L. R. HIGGINS  2,615,354
GRINDING AND SHARPENING MACHINE
Filed March 9, 1951  4 Sheets-Sheet 1
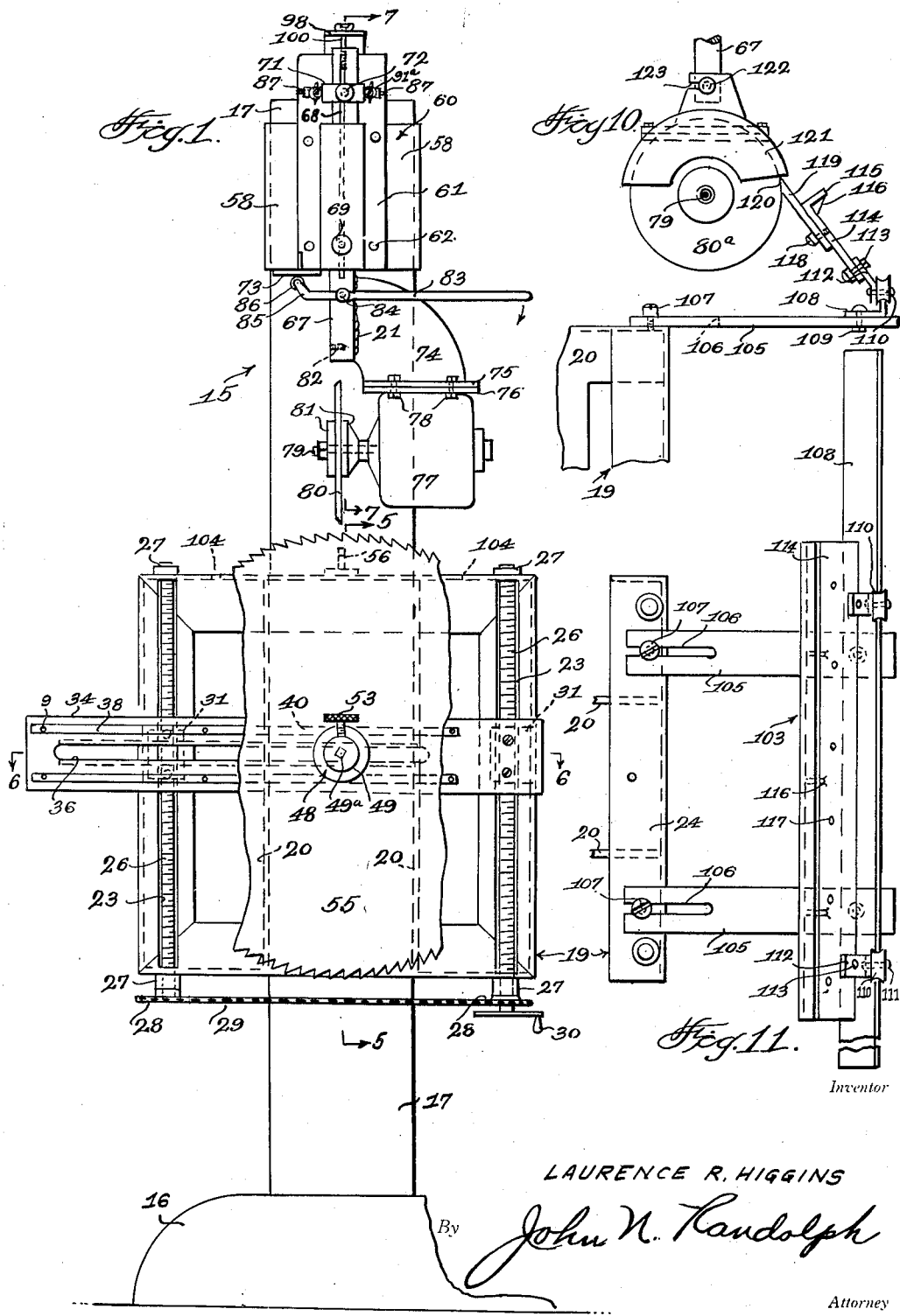
Inventor
LAURENCE R. HIGGINS
By John N. Randolph
Attorney

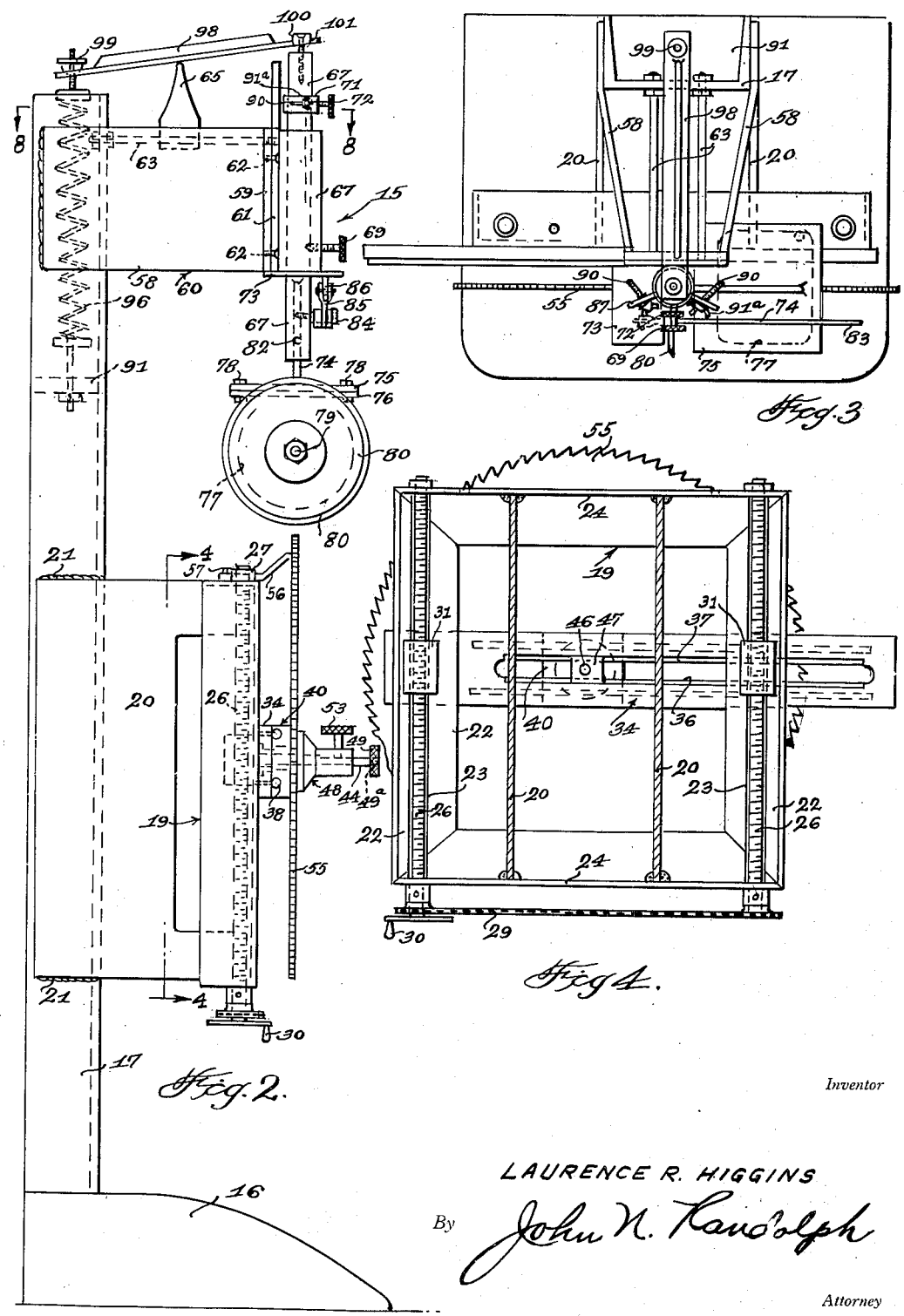

Oct. 28, 1952     L. R. HIGGINS     2,615,354
GRINDING AND SHARPENING MACHINE
Filed March 9, 1951     4 Sheets-Sheet 3
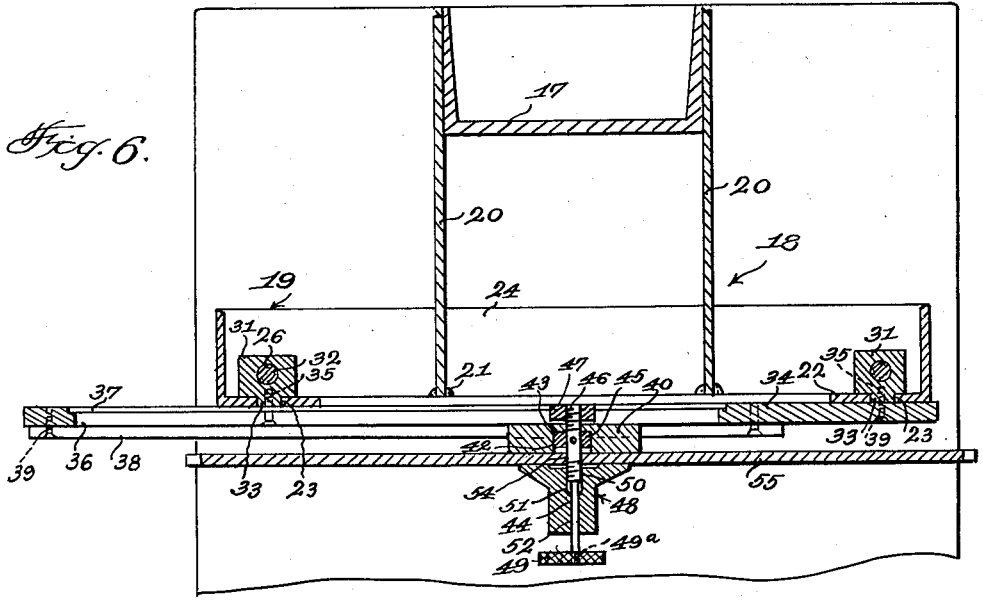
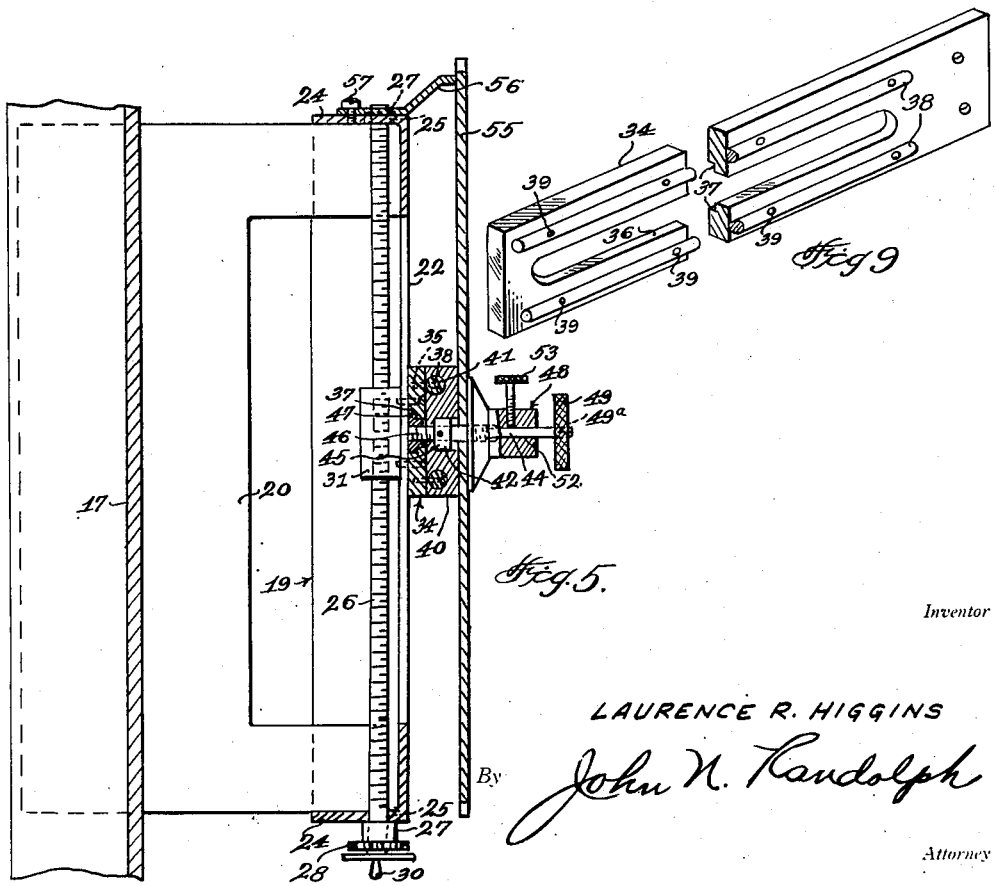
Inventor
LAURENCE R. HIGGINS
By John N. Randolph
Attorney

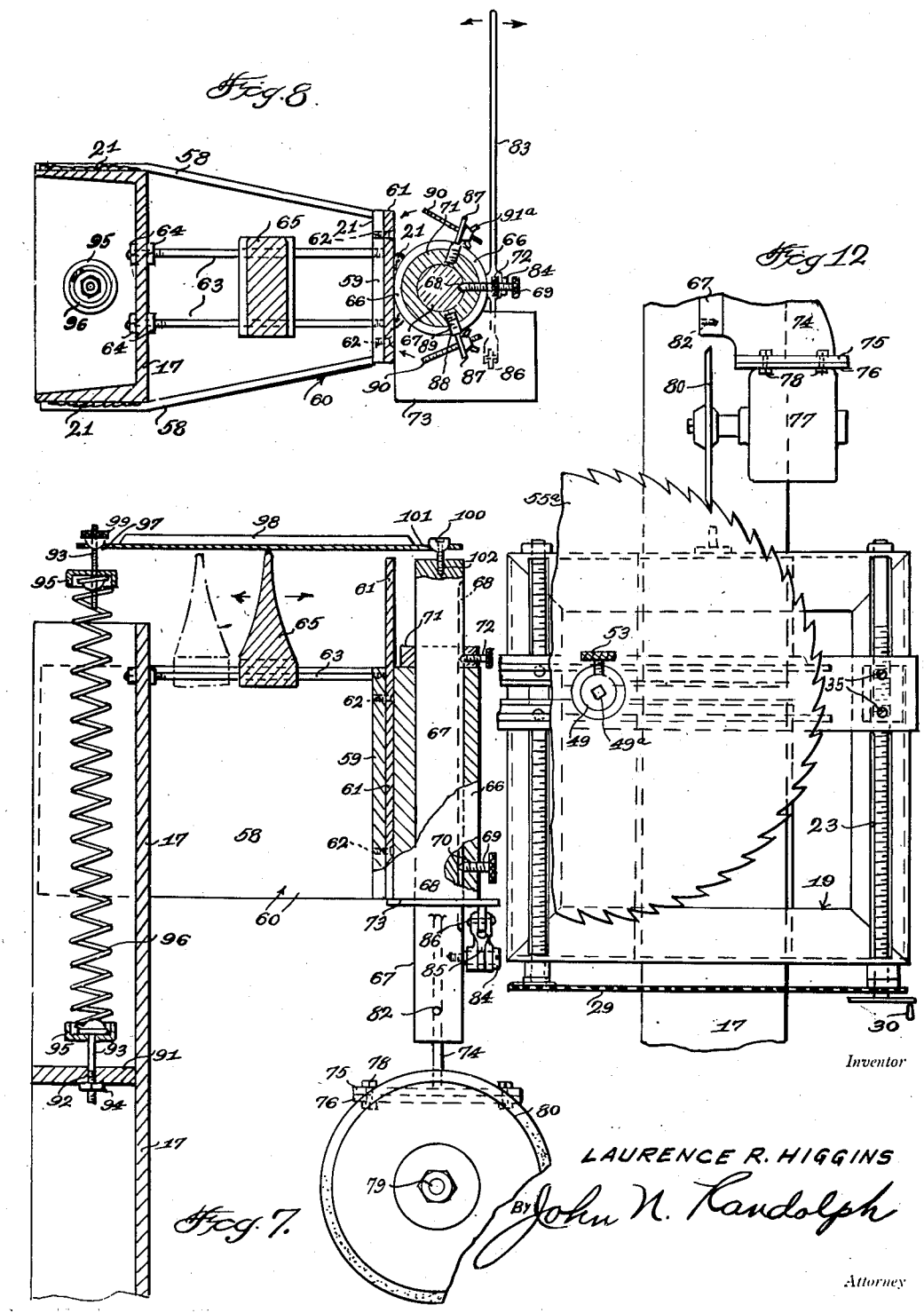

Patented Oct. 28, 1952

2,615,354

UNITED STATES PATENT OFFICE 2,615,354

GRINDING AND SHARPENING MACHINE

Laurence R. Higgins, Yakima, Wash.

Application March 9, 1951, Serial No. 214,758

5 Claims. (Cl. 76—41)

This invention relates to a machine primarily intended for use in the grinding and sharpening of circular saw blades but which is likewise capable of being utilized for grinding and sharpening blades of planes and jointers and which may also be employed for forming a circular saw blade from a disk.

It is also an object of the invention to provide a machine which will function very effectively for grinding and sharpening either circular cross cut or rip saws or the combination cross cut and ripping saws and by the use of which a totally unserviceable circular saw may be restored to perfect condition.

Various other objects and advantages of the invention will hereinafter become more fully apparent from the following description of the drawings, illustrating a preferred embodiment thereof, and wherein:

Figure 1 is front elevational view of the machine with a fragment of a circular saw shown applied thereto and positioned to be sharpened thereby;

Figure 2 is a side elevational view thereof with a circular saw blade in an applied position;

Figure 3 is a top plan view of the machine;

Figure 4 is a vertical sectional view taken substantially along a plane as indicated by the line 4—4 of Figure 2;

Figure 5 is an enlarged fragmentary vertical sectional view taken substantially along a plane as indicated by the line 5—5 of Figure 1;

Figure 6 is a horizontal sectional view taken substantially along a plane as indicated by the line 6—6 of Figure 1;

Figure 7 is an enlarged vertical sectional view taken substantially along a plane as indicated by the line 7—7 of Figure 1 and showing the sharpening wheel support in a lowermost position;

Figure 8 is a horizontal sectional view taken substantially along a plane as indicated by the line 8—8 of Figure 2 and on an enlarged scale;

Figure 9 is a fragmentary perspective view of one element of the machine;

Figure 10 is a fragmentary side elevational view showing an attachment for the machine used to sharpen jointer or planer blades;

Figure 11 is a fragmentary plan view showing the attachment of Figure 10, and

Figure 12 is a fragmentary front elevational view showing a portion of the machine with the parts adjusted for accomplishing one of the sharpening operations on the teeth of a rip saw.

Referring more specifically to the drawings, the sharpening machine in its entirety is designated generally 15 and includes a supporting base 16 which is adapted to rest upon any suitable supporting surface. The machine 15 includes an upright standard 17 of channel shaped cross section, as seen in Figures 6 and 8 having a lower end which is anchored in the base 16. The closed side of the channel member 17 faces the front of the machine, as illustrated in Figure 1.

A saw blade supporting unit, designated generally 18 and best illustrated in Figures 1, 2, and 4 to 6 includes an open substantially rectangular frame 19 formed of angle iron which is disposed in front of the standard 17 and supported rigidly with respect thereto by a pair of supporting arms 20 which are secured as by welding, as seen at 21, to portions of the sides of the standard 17 and to the inner or rear side of the frame 19 to support said frame in a perpendicular plane. The frame 19 has a front side disposed parallel to the front of the machine 15 including upright side portions 22 having corresponding elongated slots 23, as best seen in Figures 4, 5 and 6. The rearwardly extending top and bottom portions 24 of the frame 19 are provided with openings 25 which align with the slots 23 to journal unthreaded end portions of feed screws 26 which are disposed, one behind each slot 23 and which extend through the openings 25. Each feed screw 26 is retained against sliding movement through the frame portions 24 by a pair of collars 27 which are adjustably secured thereto and which bear against the outer sides of the frame portions 24. A sprocket wheel 28 is fixed to each feed screw 26 below the frame 19 and said sprocket wheels 28 are connected by an endless chain 29 whereby the two feed screws 26 always revolve as a unit and in the same direction. A hand wheel or crank 30 is secured to the lower end of one feed screw 26 beneath its sprocket 28 for accomplishing a unitary rotation of the feed screws.

A block 31 is mounted on each feed screw 26 and has a threaded bore 32 through which the feed screw extends and in which it is threadedly engaged. Each block 31 has a restricted projection 33 which extends outwardly through the adjacent slot 23 and to slightly beyond the outer or front face of the frame 19 for slidably connecting the blocks 31 to the frame 19 to prevent rotation of the blocks with the feed screws 26. An elongated bar 34, forming a part of the saw mounting unit 18, is disposed horizontally across the front side of the frame 19 and is connected by fastenings 35 which extend therethrough and into the blocks 31 to said blocks for vertical movement therewith relatively to the frame 19. As best seen in Figure 9, the bar 34 is provided with an elongated slot 36 of T-shaped cross section having its widest part adjacent the rear thereof, as seen at 37. The bar 34 is spaced slightly from the frame portions 22 by the block extensions 33 so that said bar may slide freely relatively to the frame 19 when the feed screws 26 are revolved to displace the blocks 32 vertically of the frame. A pair of rods 38 is secured to the outer or front face of the bar 34 each by a plurality of screw fastenings 39, said rods being disposed one above and one below the slot 36 and subtantially parallel thereto.

A block 40 is provided with a pair of parallel grooves 41 which extend from end to end thereof and each of which defines slightly less than a circle in cross section. The grooves 41 are disposed parallel and are spaced a distance apart to slidably engage the rods 38 for slidably mounting the block 40 against the outer face of the bar 34. The block 40 is provided with a central bore having an enlarged outer end 42 and a restricted inner end 43. A rod 44 is provided with a collar or enlargement 45 which fits in and turnably engages the recessed portion 42. Said rod 44 is provided with a restricted threaded terminal 46 which extends loosely through the restricted bore portion 43 and threadedly engages in a nut 47 of substantially T-shaped cross section which slidably but non-turnably fits the slot 36 and its widened portion 37. Accordingly, it will be seen that the rod 44 may be revolved in one direction for causing its threaded end 46 to be advanced into the nut 47 so that a portion of the block 40 will be clamped between said nut and the adjacent end of the enlargement 45 to secure the block 40 immovably to the bar 34 or by turning the rod 44 in the opposite direction the nut 47 will be loosened so that the block 40 may slide on the rod 38 longitudinally of the bar 34.

A clamping sleeve or element 48 is mounted on the rod 44 between the enlargement 45 and the handwheel 49. The handwheel 49 detachably engages a noncircular outer end 49a of the rod 44 and is detachably mounted thereon. The rod 44 is provided with a threaded portion 50 which engages in a slightly enlarged internally threaded end 51 of a longitudinal bore 52 of the clamping element 48. A setscrew 53 is threaded radially into a nut of the bore 52, outwardly of its threaded portion 51, and is adapted to be advanced into engagement with an unthreaded portion of the rod 44 to hold the element 48 against rotation when a saw blade is turned relatively thereto. Said unthreaded rod portion, which is disposed between the threaded portion 50 and end 49a, is of smaller diameter than the portion 50. Before the element 48 and handwheel are applied to the rod 44, a circular saw blade 55 is applied to the rod portion 50 over the outer end of rod 44 with the opening 54 of the saw snugly engaging rod portion 50 and the central portion of one face of the saw bearing against the block 40. The element 48 and handwheel 49 are then applied to the rod 44.

A brace member 56 is secured by one or more screw fastenings 57 to the upper side of the upper frame member 24, intermediate of its ends and said brace member has a free end projecting forwardly from the frame 19 and which bears against a portion of the inner surface of the saw blade 55 adjacent its topmost portion to prevent said portion flexing inwardly and toward the frame 19 when engaged by a grinding or sharpening wheel, as will hereinafter be described.

A pair of corresponding supporting arms 58 is secured to the standard 17 adjacent its upper end and said arms 58 project forwardly from the standard 17 in converging relationship to one another and are connected at their forward free ends to the ends of a cross member 59 with which the arms 58 combine to form an upper frame, designated generally 60. The arms 58 are connected to the standard 17 and cross member 59 by additional welds 21. A plate 61 is secured by a fastening 62 to the outer side of the frame member 59 and has an upper portion rising above the upper edge of the frame 60.

A pair of rods 63 have corresponding ends which are seated in the frame member 59 and the opposite ends of the rods 63 are threaded and extend through the intermediate portion of the standard 17 and are anchored thereto each by a pair of nuts 64 which abut opposite sides of the front standard portion. The rods 63 are disposed adjacent the level of the upper edge of the frame 60 in horizontally spaced parallel relationship and provide a support for a fulcrum member 65 which is slidably mounted thereon for movement toward and away from the standard 17 and which fulcrum member extends upwardly from the frame 60 and has a restricted upper end disposed above or adjacent the level of the upper edge of the plate 61.

A sleeve 66 is welded as indicated at 21 to the outer surface of the plate 61 and is disposed in an upright position. A supporting shaft 67 is slidably and reciprocally mounted in the sleeve 66 and is provided with a longitudinally extending groove 68 of V-shaped cross section which extends from its upper end to adjacent its lower end. A screw 69 threadedly engages a radially disposed threaded bore 70 of the sleeve 67 and has a conical inner end to engage in the groove 68, when the screw 69 is in an advanced position, to permit the shaft 67 to slide but not rotate in the sleeve 66. A collar 71 is loosely mounted on the shaft 67 above the sleeve 66 and has a setscrew 72 threaded radially therethrough which is also provided with a conical shaped inner end to engage the groove 68 and which is adapted to be tightened for clamping the collar 71 to the shaft 68 so that said collar forms a stop to limit the extent that the shaft 67 can be displaced downwardly through the sleeve 66. A plate 73 is secured in any suitable manner as by welds to a portion of the lower end of the sleeve 66 and the bottom edge of the plate 61 and is offset to one side of the bore of the sleeve 66 so as not to interfere with the reciprocating or rotating movement of the shaft 67 therein, as best illustrated in Figure 1.

A bracket arm 74, as best seen in Figure 1, is welded or otherwise secured as indicated at 21 to the lower end of the shaft 67 and longitudinally thereof. The bracket arm 74 is of angular shape and extends outwardly and downwardly from the shaft 67 and has a horizontally disposed base or flange 75 at its lower end which is laterally offset relatively to the shaft 67 and disposed at a right angle to the axis thereof. The base 76 of an electric motor 77 is secured by fastenings 78 to the underside of the flange 75 and the armature shaft 79 of the motor 77 extends transversely across an extension of the axis of the shaft 67 and is adapted to support sharpening wheels of different types thereon, one of which is shown at 80.

The armature shaft 79 carries suitable spacing and clamping means 81 for the sharpening wheel 80 so that said wheel will be disposed directly below the supporting shaft 67. The shaft 67, adjacent its lower end is provided with a threaded recess 82 which opens outwardly thereof and away from the bracket arm 74, for a purpose which will hereinafter become apparent. A lever 83 is pivotally mounted on the lower portion of the shaft 67, adjacent one end thereof, by a pivot element 84 which projects radially from the shaft 67 at a right angle to the bracket arm 74. The shorter end of the lever 83 terminates in an oblique upwardly projecting extension 85 on the terminal of which is journaled a roller 86 which is disposed to ride against the underside of the plate 73.

A pair of corresponding pins 87 have threaded ends 88 which engage radial outwardly opening recesses 89 of the collar 71 so that the pins 87 project radially from said collar at oblique angles to one another. A threaded stem 90 extends radially through a threaded opening of each pin 87 and each stem 90 carries a nut 91a adapted to be advanced against the associated pin 87 for retaining the stems in adjusted positions therein. As seen in Figure 8, the stems 90 are disposed to move into abutting engagement with the plate 61 when the collar 71 is revolved with the shaft 67 a predetermined distance in one direction, so that the two stems 90 limit the turning movement of the collar 71 with the shaft 67 in either direction from its position of Figure 8 and if the collar 71 is secured to the shaft 67 by the setscrew 72 oscillatory movement of the shaft 67 is thus limited in each direction. By advancing or retracting the stems 90 in the pins 87 the extent of this oscillating movement of the shaft 67 may obviously be varied, for a purpose which will hereinafter become apparent.

As best seen in Figures 7 and 8, the standard 17 is provided with an internal horizontally disposed web 91 which is suitably secured rigidly thereto and which is provided with an opening 92 for loosely accommodating the threaded shank of a screw 93 which extends downwardly therethrough and has a nut 94 secured adjustably to its lower end and which abuts against the underside of the web 91. The screw 93 extends through an upwardly opening socket 95 in which the bottom restricted convolution of a contractile coil spring 96 is clamped between the base of said socket 95 and the head of the screw 93. The uppermost restricted convolution of the spring 96 is similarly clamped between a corresponding downwardly opening socket 95 and the head of a second screw 93 which extends upwardly through said socket and through an opening 97 in one end of a balance beam 98. A nut 99 engages the screw 93 above the opening 97 and has a hemispherical shaped bottom portion which partially seats in the opening 97, which is substantially larger than the stem 93. A screw 100 has a substantially hemispherical shaped head which seats in an opening 101 in the opposite end of the balance beam 98 and the threaded shank of the screw 100 extends downwardly from said balance beam and is threadedly anchored in the upper end of the shaft 67 in a threaded recess 102 thereof, as best seen in Figure 7. The intermediate portion of the balance beam 98 fulcrums on the upper edge of the fulcrum member 65 and the fulcrum point of said balance beam may be readily varied as indicated in full and dotted lines in Figure 7 by sliding the fulcrum member 65 on the rod 63 toward and away from the standard 17 and shaft 67. It will be obvious that the tension of the spring 96 will urge the first mentioned end of the balance beam 98 downwardly for causing the last mentioned end to be swung upwardly to thereby normally hold the shaft 67 in an elevated position, as illustrated in Figure 1.

A shield 121, as illustrated in Figure 10, may be mounted over the upper half of the grinding wheel 80 and detachably supported on the lower end of the shaft 67 by a screw fastening 122 which engages the threaded recess 82 and which extends through a notch 123 in the upper portion of the shield 121 which bears against the shaft 67.

Assuming that the saw 55 is of a combination type including one ripping tooth to each two cross cut teeth, after the saw has been mounted on the rod 44 as previously described, the rod 44 is turned by the hand wheel 49 to loosen the nut 47 so that the block 40 carrying the saw 55 may be slid horizontally. A round faced emery wheel is applied to the armature shaft 79 in lieu of the emery wheel 80 and with the lefthand engaging the hand wheel 49 and the righthand operating the crank 30, the saw 55 is moved upwardly and laterally to properly position the uppermost tooth thereof under the emery wheel, after which the hand wheel 49 is turned to advance the rod 44 into the nut 47 to clamp the block 40 immovably to the bar 34. The clamping element 48 is then adjusted on the rod portion 50 so that the saw 55 may be turned manually. The setscrews 69 and 72 are then loosened and the shaft 67 is displaced downwardly by manually engaging and swinging the longer end of the lever 83 downwardly until the emery wheel is disposed in a gullet of a ripping tooth. The collar 71 is then positioned at a desired distance above the upper end of the sleeve 66 to permit the shaft 67 and emery wheel to be displaced downwardly a further distance corresponding to the desired depth of the gullet and said collar 71 is secured in this adjusted position by tightening its setscrew 72. The setscrew 69 is also tightened sufficiently so that the shaft 67 can be reciprocated but may not be rotated in the sleeve 66. With the motor 77 operating to revolve the emery wheel, the longer end of the lever 83 is swung downwardly to lower the emery wheel into the ripping tooth gullet and for lightly brushing the face of the ripping tooth. As the emery wheel is thereafter raised out of the gullet, the back of the tooth to the left of the ripping tooth as viewed in Figure 1 is shaped by turning the saw slightly in a clockwise direction with the left hand, as seen in Figure 1.

After all of the ripping teeth of the saw 55 have thus been sharpened, the collar 71 is reset so that the emery wheel may only be lowered sufficiently to brush the points of all of the teeth and with the emery wheel operating and held in its lowermost position the saw is manually rotated until the tips of all of the teeth have been reduced to a uniform extent so that all of the teeth will be of the same length.

The emery wheel previously used is then replaced by the emery wheel 80 as shown in Figure 1 having a beveled periphery facing away from the motor 77. The collar 71 is then reset on the shaft 67 so that the emery wheel 80 will fit into the gullets of the cross cut teeth with allowance for the extra depth of cutting desired. The threaded stems 90 are then adjusted in the pins 87 and locked by the nuts 91a to provide a certain clearance between said stems and the plate 61, preferably about five-eighths of an inch. The setscrew 69 is then backed off so that the shaft 67 carrying the emery wheel may be oscillated by the lever 83 in either direction through an arc of about 25°. In shaping the cross cut saw teeth the emery wheel is displaced downwardly by operation of the lever 83 into each cross cut tooth gullet brushing the face of the right-hand tooth lightly after which the lever is actuated to swing the emery wheel 80 by turning the shaft 67 to grind the proper pitch to the face of each cross cut tooth. As the emery wheel is raised out of each cross cut tooth gullet the saw is rotated slightly in a clockwise direction, as seen in Figure 1 for shaping the back of the tooth disposed to the left of the emery wheel. The emery wheel is swung in one direction for beveling the cross cut teeth adjacent one face of the saw and is swung in the opposite direction for beveling the cross cut teeth at the opposite face of the saw. After an operator has become proficient in the operation of the machine 15 it will not even be necessary to finish the pointing of the teeth with a hand file as this operation can be completed with the emery wheel.

It will likewise be readily apparent that separate cross cut and rip saws may be sharpened in the manner as previously described for cross cut saw teeth and rip saw teeth, respectively.

Teeth of a rip saw blade may be sharpened so that the face of each tooth is at an angle to the radius of the blade. This is accomplished by displacing the block 40 to the left, as illustrated in Figure 12, so that the proper angular cutting of the teeth may be accomplished. For this purpose the sharpening wheel 80 is employed and the flat side thereof sharpens the face of one tooth as the wheel is moved downward into the gullet. As the wheel 80 is raised the saw blade is turned slightly clockwise so that the beveled portion of the wheel will shape the back edge of the tooth disposed to the left of the tooth previously sharpened.

The machine 15 is also provided with an attachment as illustrated in Figures 10 and 11 for use in sharpening blades such as plane blades and jointer blades which attachment, designated generally 103 includes a pair of headed screws which extend downwardly into the top frame portion 24 to threadedly engage openings 104 thereof. A pair of bars 105 are provided with longitudinally extending slots 106 for engaging said screws 107 beneath the heads thereof so that the screws may be tightened for clamping the slotted ends of the bars 105 between the screw heads and the top frame member 24. The bars 105 extend outwardly from the front of the frame 19 and are connected near their outer ends by a length of angle iron 108 which is secured thereto and transversely thereof by fastenings 109. The angle iron 108 has an upstanding flange forming a rail which is engaged by two peripherally grooved wheels or rollers 110 which are journaled on pins 111 which are secured to and project from corresponding ends of rigid strap members 112. The opposite ends of the strap members 112 are obliquely disposed relatively to said first mentioned ends and are secured by fastenings 113 to longitudinally spaced portions of a blade supporting bar 114 which projects upwardly at an oblique angle from the plane of the bars 105 and which is disclosed as provided at its upper edge with an upturned flange 115 which is braced by a plurality of webs 116. The blade supporting bar 114 is provided with a plurality of longitudinally spaced threaded openings 117 to receive threaded fastenings 118 by means of which one or a plurality of blades 119 may be secured to the underside of the bar 114 and so that the cutting edges 120 of the blades will be disposed above or beyond the upper edge of the bar 114 to engage the periphery of an emery wheel 80a mounted on the armature shaft 79. The collar 71 and setscrews 69 and 72 may be adjusted to hold the shaft 67 and emery wheel 80a rigidly while sharpening a blade or blades 119 and it will be readily apparent that the blade holder 114 may be moved laterally of the emery wheel 80a by the wheels 110 riding the rail 108 so that the cutting edge 120 will traverse the emery wheel. Additionally, the bars 105 may be adjusted by means of their slots 106 relatively to the frame 19 so that the blade holder 114 and the blades 119 will be disposed at different angles with respect to the bars 105 when the edge of the blade or blades are in engagement with the emery wheel for producing any desired bevel on the cutting edge or edges 120.

Various modifications and changes are contemplated and may obviously be resorted to, without departing from the spirit or scope of the invention as hereinafter defined by the appended claims.

I claim as my invention:

1. In a grinding and sharpening machine, an upright standard, work supporting means secured to the standard and adapted to demountably support a blade to be sharpened in a plurality of horizontally and vertically adjusted positions relatively to the standard, a sharpening wheel supporting unit including a frame rigidly secured to and supported by the standard above the work supporting means and having a vertically disposed sleeve, a shaft rotatably and slidably mounted in said sleeve, a bracket secured to said shaft below the sleeve, a rotary sharpening wheel having a power source secured to said bracket for supporting the sharpening wheel in a vertical plane above the work supporting means and perpendicular thereto, means for adjustably retaining the shaft in the sleeve to support the sharpening wheel at different levels above said work supporting means and at various angles with respect thereto, a fulcrum member rising from the sharpening wheel supporting unit and slidably supported thereby for movement toward and away from said shaft, a beam fulcrumed intermediate of its ends on said fulcrum member having one end pivotally connected to the upper end of said shaft, and contractile spring means connected to the opposite end of said beam and adjustably connected to a portion of the standard to yieldably support the shaft and sharpening wheel and for normally raising the sharpening wheel to an elevated, inoperative position.

2. In a grinding and sharpening machine, an upright standard, work supporting means secured to the standard and adapted to demountably support a blade to be sharpened in a plurality of horizontally and vertically adjusted positions relatively to the stardard, a sharpening wheel supporting unit including a frame rigidly secured to and supported by the standard above the work supporting means and having a vertically disposed sleeve, a shaft rotatably and slidably mounted in said sleeve, a bracket secured to said shaft below the sleeve, a rotary sharpening wheel having a power source secured to said bracket for supporting the sharpening wheel in a vertical plane above the work supporting means and perpendicular thereto, means for adjustably retaining the shaft in the sleeve to support the sharpening wheel at different levels above said work supporting means and at various angles with respect thereto, a fulcrum member rising from the sharpening wheel supporting unit and slidably supported thereby for movement toward and away from said shaft, a beam fulcrumed intermediate of its ends on said fulcrum member having one end pivotally connected to the upper end of said shaft, contractile spring means connected to the opposite end of said beam and adjustably connected to a portion of the standard to yieldably support the shaft and sharpening wheel and for normally raising the sharpening wheel to an elevated, inoperative position, a plate fixed to the sharpening wheel supporting unit to one side of said shaft, a lever pivotally mounted intermediate of its ends on the shaft below said sleeve, and a roller journaled on one end of said lever and engaging under said plate for displacing the shaft and sharpening wheel downwardly against the action of said spring means when the opposite end of said lever is swung downwardly.

3. A machine as in claim 2, said lever being movable horizontally in either direction for oscillating the shaft and sharpening wheel relatively to said sleeve.

4. In a grinding and sharpening machine, an upright standard, work supporting means secured to the standard and adapted to demountably a blade to be sharpened in a plurality of horizontally and vertically adjusted positions relatively to the standard, a sharpening wheel supporting unit including a frame rigidly secured to and supported by the standard above the work supporting means and having a vertically disposed sleeve, a shaft rotatably and slidably mounted in said sleeve, a bracket secured to said shaft below the sleeve, a rotary sharpening wheel having a power source secured to said bracket for supporting the sharpening wheel in a vertical plane above the work supporting means and perpendicular thereto, means for adjustably retaining the shaft in the sleeve to support the sharpening wheel at different levels above said work supporting means and at various angles with respect thereto, said means for adjustably retaining the shaft relatively to the sleeve including a collar adjustably secured to the shaft above the sleeve forming an abutment to limit downward displacement of the shaft through the sleeve, circumferentially spaced stop elements projecting from said collar and adjustably mounted relatively thereto, said stop elements being disposed for movement into engagement with a part of the sharpening wheel supporting unit when said shaft is revolved in either direction for adjustably limiting the oscillating movement of the shaft relatively to said sleeve, and a lever pivotally connected to the shaft below the sleeve for vertical swinging movement thereon having one end bearing against the under surface of a portion of the sharpening wheel supporting unit for displacing the shaft downwardly relatively to the sleeve when the other end of said lever is swung downwardly to displace the sharpening wheel downwardly and toward the blade to be sharpened, said last mentioned lever end being horizontally swingable to oscillate the shaft in the sleeve for angularly adjusting the plane of the sharpening wheel relatively to the plane of the blade.

5. A machine as in claim 4, and spring biased means connected to said shaft and yieldably urging the shaft upwardly for yieldably supporting the sharpening wheel in an elevated, inoperative position.

LAURENCE R. HIGGINS.

REFERENCES CITED

The following references are of record in the file of this patent:

UNITED STATES PATENTS

| Number | Name | Date |
|---|---|---|
| 574,855 | Schofield | Jan. 5, 1897 |
| 642,275 | Zacharias | Jan. 30, 1900 |
| 768,493 | Vogel | Aug. 23, 1904 |
| 1,256,782 | Foster | Feb. 19, 1918 |
| 1,279,025 | Shay | Sept. 17, 1918 |
| 1,437,620 | Strehl | Dec. 5, 1922 |
| 1,480,172 | Majewicz | Jan. 8, 1924 |
| 1,491,706 | Klin | Apr. 22, 1924 |
| 1,530,378 | Lanfranchi | Mar. 17, 1925 |
| 1,658,691 | Shiria | Feb. 7, 1928 |
| 1,846,331 | Hickey | Feb. 23, 1932 |
| 2,142,669 | Carpenter | Jan. 3, 1939 |